United States Patent
Balsley, Jr. et al.

[11] Patent Number: 6,011,670
[45] Date of Patent: Jan. 4, 2000

[54] DISK DRIVE WITH INTEGRATED PRESASSEMBLED ACTUATOR AND HEADER ASSEMBLY AND SPIN MOTOR ASSEMBLY

[75] Inventors: Richard B. Balsley, Jr., Boulder; William Godette, Longmont, both of Colo.

[73] Assignee: Seagate Technology, Inc., Scotts Valley, Calif.

[21] Appl. No.: 08/905,849

[22] Filed: Aug. 4, 1997

Related U.S. Application Data

[63] Continuation of application No. 08/583,335, Jan. 5, 1996, abandoned, which is a continuation of application No. 08/400,462, Mar. 7, 1995, abandoned, which is a continuation of application No. 07/949,737, Sep. 23, 1992, abandoned.

[51] Int. Cl.[7] .................................................. G11B 5/012
[52] U.S. Cl. ......................................................... 360/97.01
[58] Field of Search ............................... 360/97.01, 97.02, 360/97.03, 98.01, 99.08, 106, 903, 98.07

[56] References Cited

U.S. PATENT DOCUMENTS

| | | | |
|---|---|---|---|
| 4,764,829 | 8/1988 | Marino .................................... | 360/106 |
| 4,812,935 | 3/1989 | Sleger ..................................... | 360/106 |
| 4,879,618 | 11/1989 | Iida et al. .............................. | 360/98.01 |
| 5,016,131 | 5/1991 | Riggle et al. ........................ | 360/98.01 |
| 5,025,335 | 6/1991 | Stefansky ............................. | 360/97.01 |
| 5,025,336 | 6/1991 | Morehouse et al. .................. | 360/97.02 |
| 5,050,026 | 9/1991 | Goss ...................................... | 360/98.01 |
| 5,109,310 | 4/1992 | Ohkjita et al. ....................... | 360/97.01 |
| 5,195,002 | 3/1993 | Sakvrat ................................ | 360/99.08 |

OTHER PUBLICATIONS

Bursky, Dave; "Subminiature Disk Drives Become PC–Board–Mountable Components"; 6125192; V40, N13 P. 32.

Rohrbough, Linda; "TEAC Claims Industry First in Drive Sizes"; Sep. 27, 1991.

*Primary Examiner*—David D. Davis
*Attorney, Agent, or Firm*—Fliesler, Dubb, Meyer & Lovejoy LLP

[57] ABSTRACT

A two and one-half inch form factor disk drive. The disk drive includes a base having a top and a bottom, and at least one storage disk. A spin motor is secured to the base and the disk is mounted thereon. Read/write heads are provided for reading information from and writing information on the storage disk. The read/write heads are supported and positioned by an actuator in response to control signals, the actuator having top and bottom plates comprising a support structure, the top plate being supported on the base. A cover is sealably attached to the base, such that the base and cover enclose the disk, the heads, and the actuator. In addition, control electronics, mounted on the head-disk assembly so that the control electronics are adjacent to the bottom of the base, generate the control signals to control the actuator means and provide information signals to and receive information signals from the read/write heads. The disk drive has an overall maximum height equal to or less than substantially twelve and one-half millimeters (12.5 mm). In a further aspect, the disk drive further includes a header assembly for electrically coupling a printed circuit board including the control electronics to the actuator, read/write heads and spin motor. The drive further includes an actuator assembly fabricated such that the actuator assembly and the header assembly are secured to a single mounting member thereby providing an integrated header and actuator assembly for insertion into the disk drive.

8 Claims, 12 Drawing Sheets

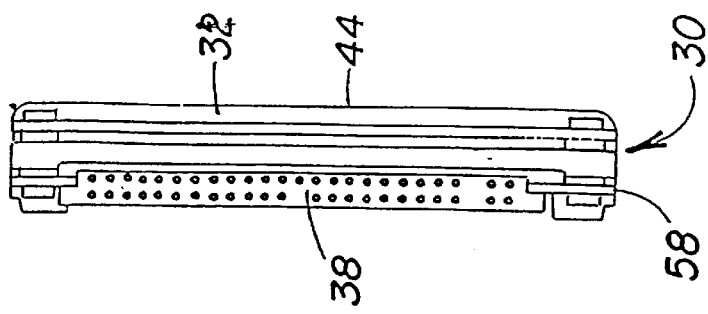
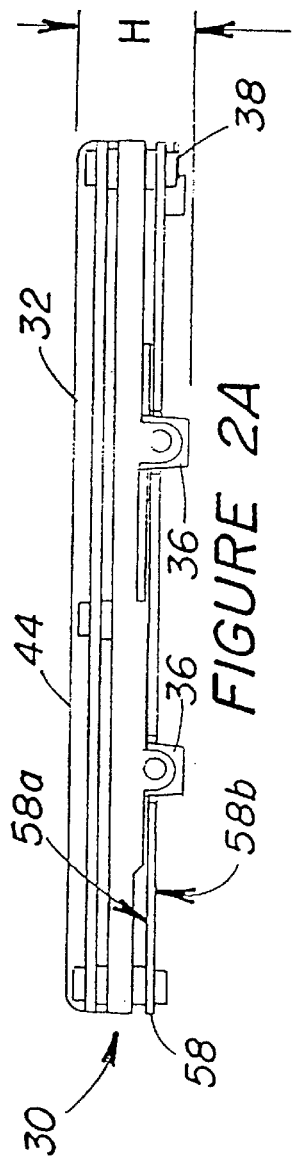
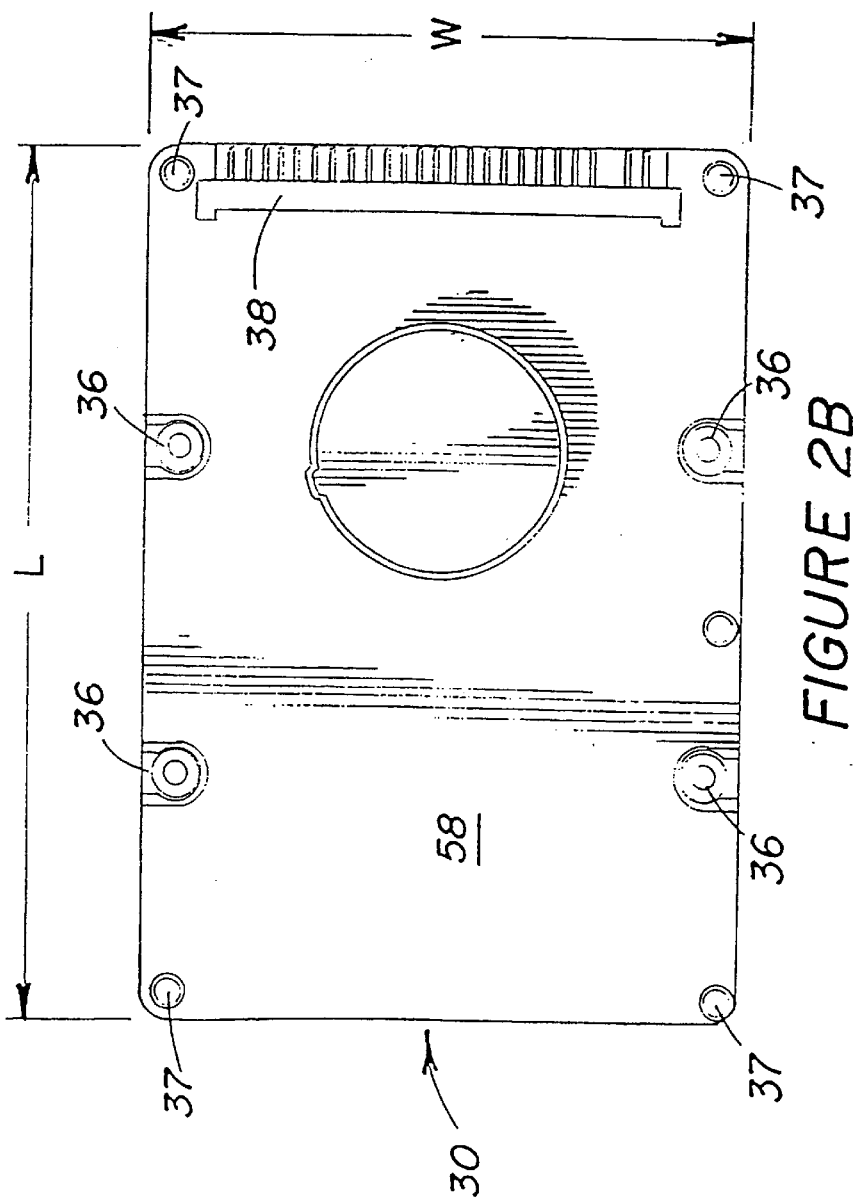

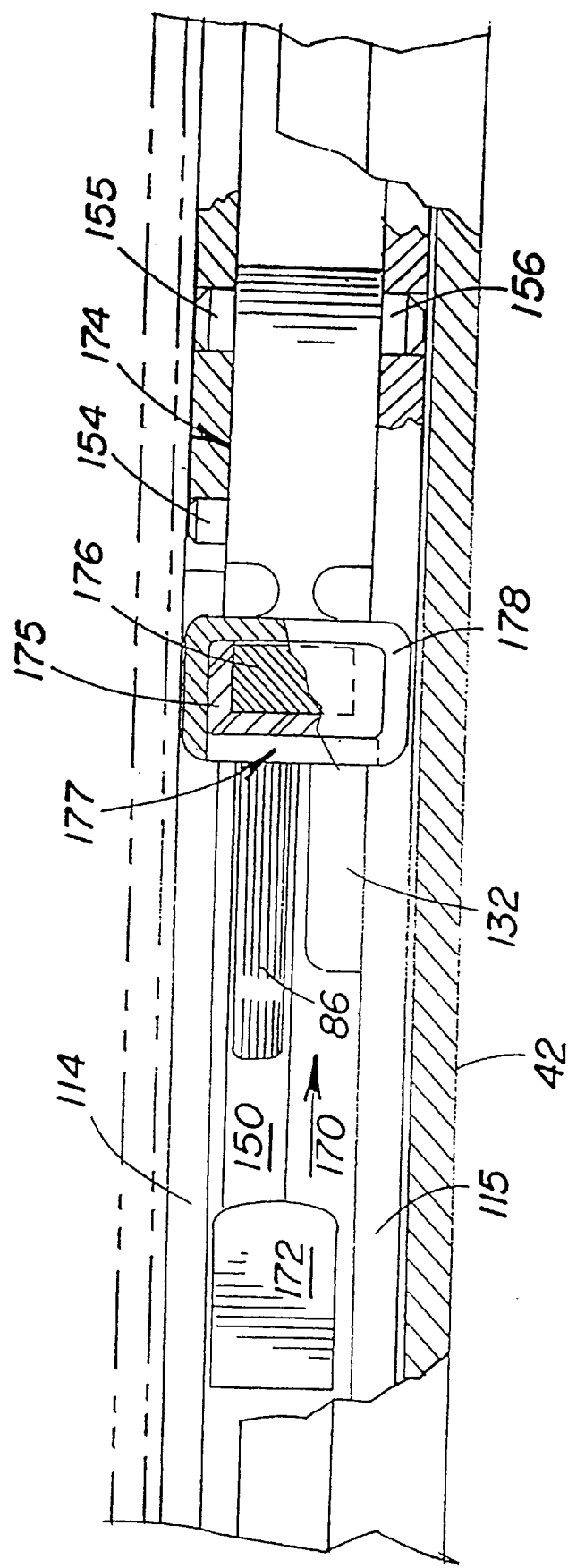

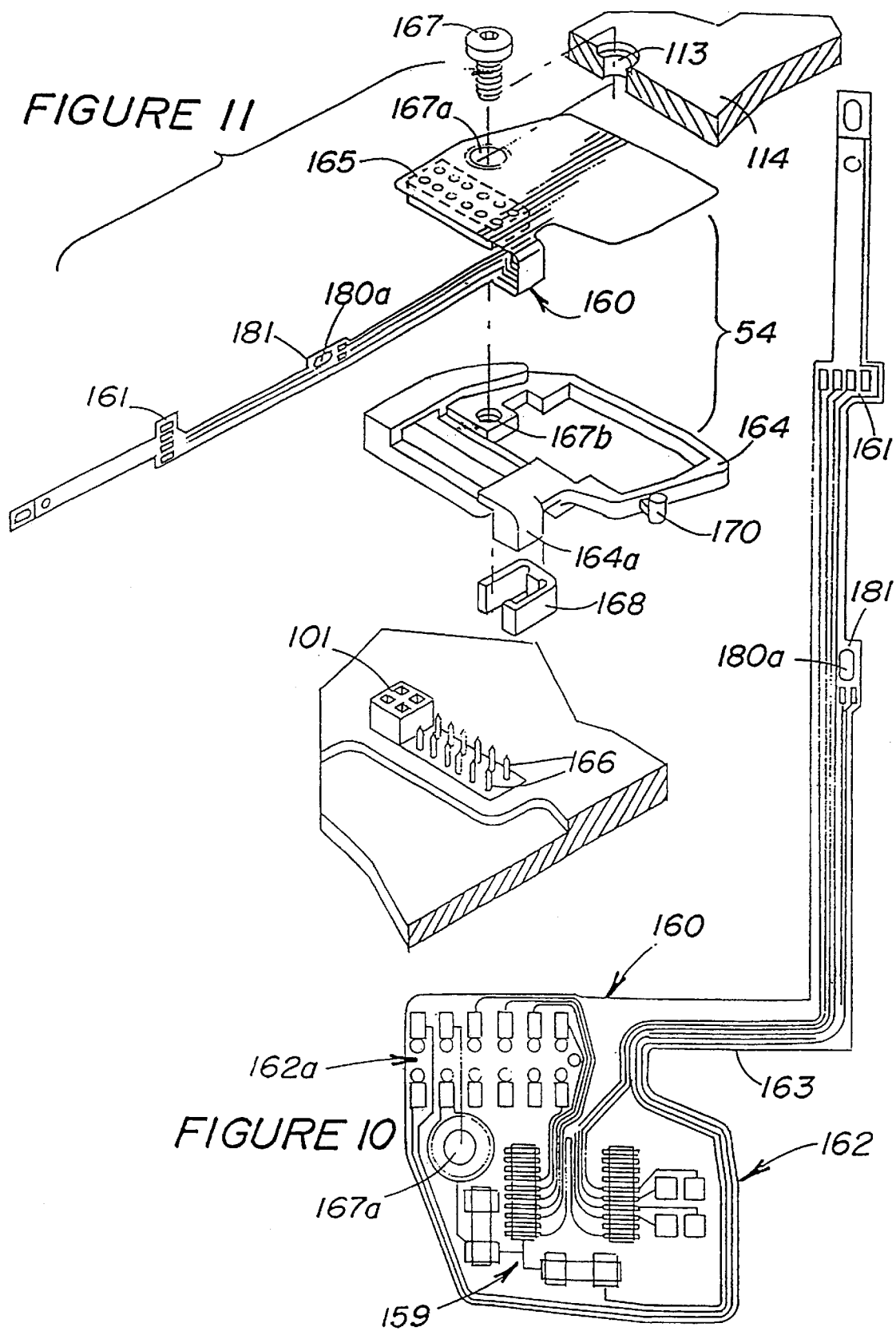

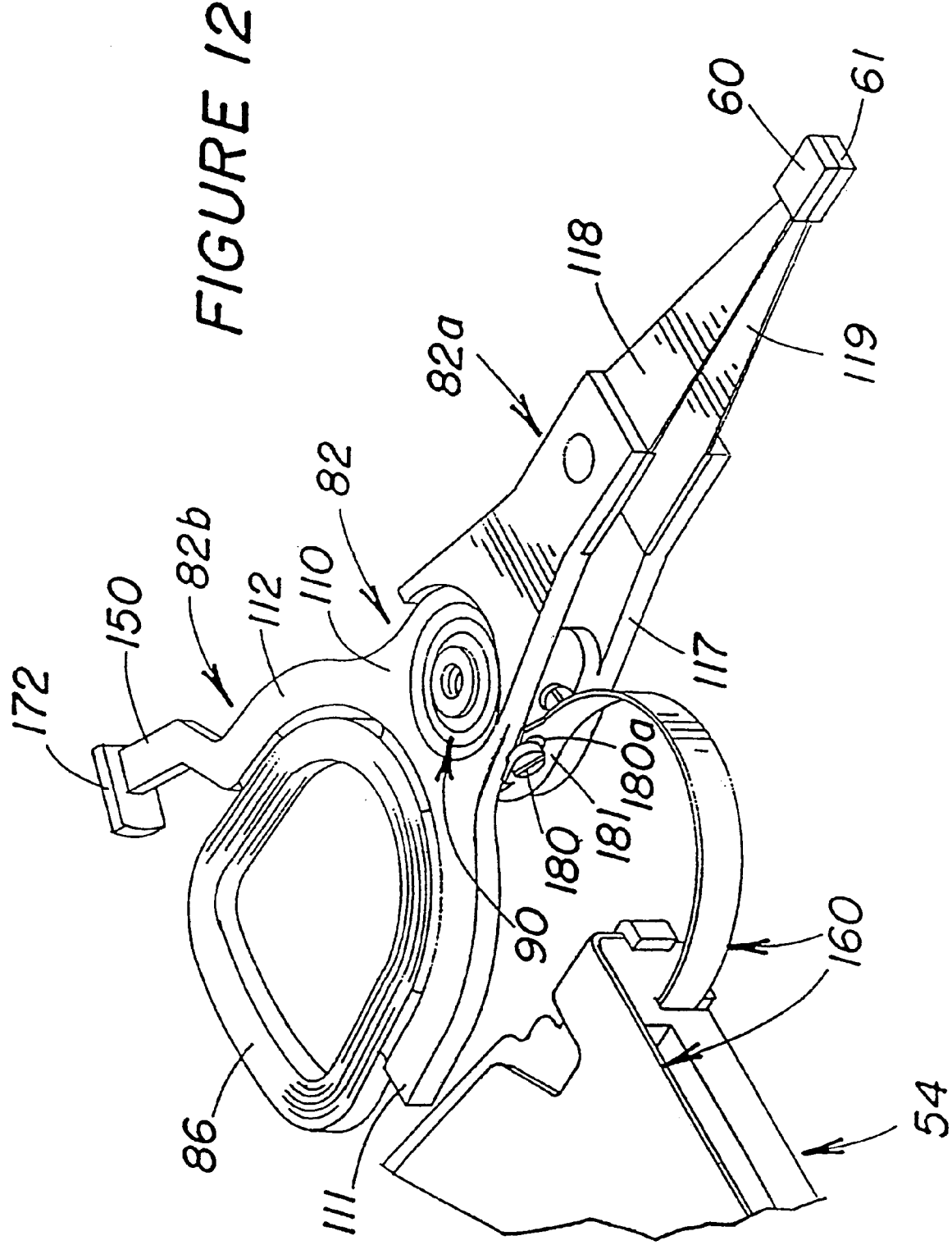

DISK DRIVE WITH INTEGRATED PRESASSEMBLED ACTUATOR AND HEADER ASSEMBLY AND SPIN MOTOR ASSEMBLY

This application is a Continuation of Ser. No. 08/583,335, filed Jan. 5, 1996, now abandoned, which was a continuation of Ser. No. 08/400,462, filed Mar. 7, 1995, now abandoned, which was a continuation of Ser. No. 07/949,737, filed Sep. 23, 1992, now abandoned.

CROSS-REFERENCE TO RELATED APPLICATIONS AND PATENTS

ARCHITECTURE FOR SEALED DISK DRIVE, Ser. No. 664,659, filed Mar. 5, 1991, which is a divisional of U.S. Pat. No. 5,029,026, which is a divisional of Ser. No. 056,584, filed May 29, 1987 now abandoned.

DISK DRIVE SYSTEM CONTROLLER ARCHITECTURE, U.S. Pat. No. 4,979,056.

DISK DRIVE SOFTWARE SYSTEM ARCHITECTURE, Ser. No. 07/790,008, filed Nov. 4, 1991, which is a file wrapper continuation of Ser. No. 488,386, filed Feb. 23, 1990, which is a continuation of Ser. No. 057,806, filed Jun. 2, 1987, now abandoned.

DISK DRIVE SYSTEM CONTROL ARCHITECTURE UTILIZING EMBEDDED REAL-TIME DIAGNOSTIC MONITOR, U.S. Pat. No. 4,979,055.

LOW-POWER HARD DISK DRIVE ARCHITECTURE, Ser. No. 564,693, filed Aug. 7, 1990, which is a continuation of Ser. No. 152,069, filed Feb. 4, 1988, now abandoned.

DISK DRIVE SYSTEM EMPLOYING ADAPTIVE READ/WRITE CHANNEL CONTROLS AND METHOD OF USING SAME, Ser. No. 07/784,655, filed Oct. 28, 1991, which is a file wrapper continuation of Ser. No. 420,371, filed Oct. 12, 1989.

DISK DRIVE SYSTEM USING MULTIPLE EMBEDDED QUADRATURE SERVO FIELDS, Ser. No. 07/860,299, filed Mar. 27, 1992, which is a file wrapper continuation of Ser. No. 386,504, filed Jul. 27, 1989.

ARCHITECTURE FOR 2½ INCH DIAMETER SINGLE DISK DRIVE, U.S. Pat. No. 5,025,335.

Each of these Related Applications and Patents are assigned to the Assignee of this subject Patent and are hereby incorporated by reference.

BACKGROUND OF THE INVENTION

1. Field of the Invention

The present invention relates to hard disk drives; more particularly, to hard disk drives which have reduced size and weight, and increased storage capacity.

2. Description of the Related Art

Data storage technology follows a continuing trend towards increasing storage density, and reducing device weight, size, and power consumption. One factor motivating these trends is the increasing use of lap-top, notebook, palm-top, and other portable and/or battery-powered computers. Portability requires reduced size (physical dimensions) and weight. Increased storage density is necessary so that a disk drive having a reduced physical size can provide the same storage capacity as a physically larger drive.

The dimensions of disk drives have generally become standardized around certain so-called "form factors." Eight inch (8") disk drives were followed by the five and one-quarter inch (5¼") disk drives. The length of a 5¼" drive is approximately the width of an 8" drive and the width of a 5¼" drive is approximately one-half of the length of an 8" drive. This same size relationship applies to the relationship between so-called three and one-half inch (3½") drives and 5¼" drives (a 3½" drive is approximately one half the size of a 5¼" drive), and to the relationship between two and one-half inch (2½") drives and 3½" drives (a 2½" drive is approximately one half the size of a 3½" drive).

In addition, the heights of disk drives have changed. Initially, this relationship followed a trend similar to form factors, full height 5¼" drives were reduced to half-height 5¼" drives (a height of approximately 1.625"). The half-height form factor was the starting point for 3½" drives, which were later reduced to a one inch (1.0") height form factor and lower. For 2½" form factor disk drives, a typical height is in the range of 0.71"–0.75", generally depending on whether the drive has one or two disks. With the increasing popularity of portable and notebook computers, the thrust toward reduced size and increased capacity remains extremely strong.

Typically, Winchester-type hard disk drives incorporate a storage medium or disk, read-write transducers or "heads" to transfer information to and from the disks, a spin motor for rotating the disks, an actuator assembly for positioning the heads with respect to the disk, and control electronics (usually on a printed circuit board) incorporating means for communicating with a host computer, means for controlling data transfer functions to and from the disk, and means for controlling the integral components of the disk drive. A number of Winchester-type hard disk drive designs incorporate the disk, heads, actuator assembly and spin motor within a controlled environment, isolated from ambient atmospheric conditions. Generally, the controlled environment is provided in the hard disk assembly (HDA) portion of the drive which, along with the control electronics, may comprise an integrated mechanical assembly substantially (or totally) defining the desired form factor.

The HDA generally comprises: a base, on which the disk, heads, actuator assembly, spin motor, and connectors are mounted;, and a cover, which forms an intersecting fit with the base and encloses the components in the drive, thereby creating the controlled environment between the base and cover. A gasket may be provided between the cover and the base to ensure a seal therein between. Typically, such drives can withstand pressure changes in a range of 200 feet below sea level to 10,000 feet above sea level.

Because of the sensitivity of the components contained within the controlled environment, contamination is a major cause of drive failure. The prevention of contamination within the drive is thus a specific and important design goal. As the overall size of the disk drives has decreased, so has the volume within the controlled environment surrounding the contaminant sensitive elements of the drive. In two and one-half inch form factor drives, the reduced size of the controlled environment has resulted in contamination problems resulting from outgassing, e.g. the tendency of certain materials used in manufacturing the drive to exude gasses within the controlled environment over the life of the drive. Outgassing causes a buildup within, and eventual release of pressure from, the controlled environment. Such a release allows contamination to enter the drive, which may thereby compromise data integrity.

Materials known to cause outgassing problems are pressure sensitive adhesives. Adhesives, such as Part No. Y-9460 pressure sensitive adhesive, manufactured by Minnesota Mining and Manufacturing (3M) Company, St. Paul, Minn., are typically used at various stages in drive manufacture. Such pressure sensitive adhesives are used in a number of sub-assemblies in the controlled environment. For example, in an actuator assembly, which typically consists of an actuator body, having read/write heads coupled thereto, and a bearing cartridge, which allows the actuator body to rotate (generally about a post) on the base plate, adhesives are used to secure the bearing cartridge to the actuator body. In another aspect, adhesives are used to secure the spin motor to the base plate. Further, many drives incorporate flex circuits to carry data from the printed circuit board to the actuator. The flex circuit has one end coupled to the actuator and another end coupled to a bracket and header, which couples the circuit to the PCB. In such applications, adhesives are used in securing both ends of the flex circuit.

SUMMARY OF THE INVENTION

It is therefore, an object of the present invention to provide a hard disk drive having a height form factor equal to approximately therefor twelve and one-half millimeters (12.5 mm or 0.49 inch).

An additional object of the invention is to provide the above object in a drive wherein the control electronics for the drive are positioned adjacent to the HDA, and the total assembled height of the drive does not exceed twelve and one-half millimeters (12.5 mm or 0.49 inch).

A further object of the present invention is to reduce the amount of outgassing and resultant contamination found in two and one-half inch (2½") form factor disk drives.

It is a further objective of the present invention to provide a 2½" form factor, reduced height disk drive, having reduced use of adhesives in the hard disk assembly (HDA) portion of the drive.

A further object of the invention is to provide a disk drive which is easy to manufacture in substantial quantities, and thus to provide a novel method for manufacturing the drive.

It is a further object of the invention to provide the above objects in a drive having an integrated actuator assembly which may be assembled and tested prior to installation into the HDA.

Yet another object of the invention is to provide the above objects in a drive utilizing a header assembly, to connect control electronics on the printed circuit board to the controlled environment of the drive, wherein a limited amount of adhesives are used to manufacture the header assembly.

An additional object of the present invention is to integrate the actuator and header assemblies, allowing them to be assembled prior to being secured in the drive, thereby substantially improving the efficiency and speed of drive assembly, and allowing for testing of the actuator/header assembly prior to installation thereof into the drive.

These and other objects of the invention are provided in a two and one-half inch form factor disk drive. The disk drive includes a base having a top and a bottom, and at least one storage disk. A spin motor is secured to the base and the disk is mounted thereon. Read/write heads are provided for reading information from and writing information on the storage disk. The read/write heads are supported and positioned by an actuator in response to control signals, the actuator having top and bottom plates comprising a support structure, the top plate being supported on the base. A cover is sealably attached to the base, such that the base and cover enclose the disk, the heads, and the actuator. In addition, control electronics, mounted on the head-disk assembly so that the control electronics are adjacent to the bottom of the base, generate the control signals to control the actuator means and provide information signals to and receive information signals from the read/write heads. The disk drive has an overall maximum height equal to substantially twelve and one-half millimeters (12.5 mm).

In a further aspect, the disk drive further includes a header assembly for electrically coupling a printed circuit board including the control electronics, mounted on the bottom of the base, to the actuator, read/write heads and spin motor. The header assembly includes: a connector, potted in the base plate and engaging the PCB, an actuator flex circuit, coupled to the connector and the actuator, and a spin motor flex circuit coupled to the connector and the spin motor. The drive further includes an actuator assembly fabricated such that the actuator assembly and the header assembly are secured to a single mounting member thereby providing an integrated header and actuator assembly for insertion into the disk drive.

In yet another aspect, the an actuator assembly comprises the top plate and bottom plate, an actuator arm having secured thereto first and second head suspensions, the head suspensions supporting first and second read/write heads, a bearing cartridge, secured to the actuator body and to the top plate by non-adhesive means, and a voice coil motor.

BRIEF DESCRIPTION OF THE DRAWINGS

The invention will be described with respect to the particular embodiments thereof. Other objects, features, and advantages of the invention will become apparent with reference to the specification and drawings in which:

FIGS. 2A–2C are views of the assembled hard disk assembly and printed circuit board of the disk drive of the present invention.

FIG. 9 is a cross-sectional view along line 9—9 in FIG. 5.

FIG. 10 is a plan view of the actuator flex circuit utilized in the disk drive.

FIG. 11 is a perspective, exploded view of the header assembly and actuator flex circuit of the disk drive of the present invention.

FIG. 12 is a reverse perspective view of the actuator arm of the disk drive, opposite the view of FIG. 8.

DESCRIPTION OF THE PREFERRED EMBODIMENTS

A disk drive according to the present invention will be described with reference to FIGS. 1–12. The disk drive described herein includes, for example, a single hard disk with a magnetic coating and utilizes Winchester technology; however, the disk drive may utilize various numbers of disks (and a corresponding number of heads, usually one per disk surface, i.e., two (2) heads per disk) and other types of disks, for example, optical disks, and other read/write technologies, for example, lasers.

Advances in data storage technology and the reduced size of computers have led to disk drives having smaller physical dimensions. The inventor of the disk drive which is the subject of this patent realized that further reductions in the size of disk drives would not be possible without redesigning certain components of the reduced size drive. Designing a two and one-half inch form factor disk drive which has a height lower than seven-tenths of an inch (0.7"), and in this particular embodiment, a height of 12.5 mm or approximately 0.49 inch, has presented the challenge of redesigning many drive components; for example, the standard structure for mounting the actuator assembly in the drive. In addition, to ensure reliability of the drive over time, components previously manufactured using pressure sensitive adhesives have been redesigned to reduce use of such adhesives in the controlled environment of the drive.

Disk drive 30 is ideal for use in lap-top, notebook, palm-top, or other portable or other battery-powered computers due to the reduced height form factors and the small power consumption. Power consumption for various modes is as follows: Read/Write Mode 350 ma; Seek Mode 350 ma; Idle Mode 210 ma; Standby Mode 70 ma; Sleep Mode 24 ma; and Spin-Up Mode 700 ma.

Figure 1:
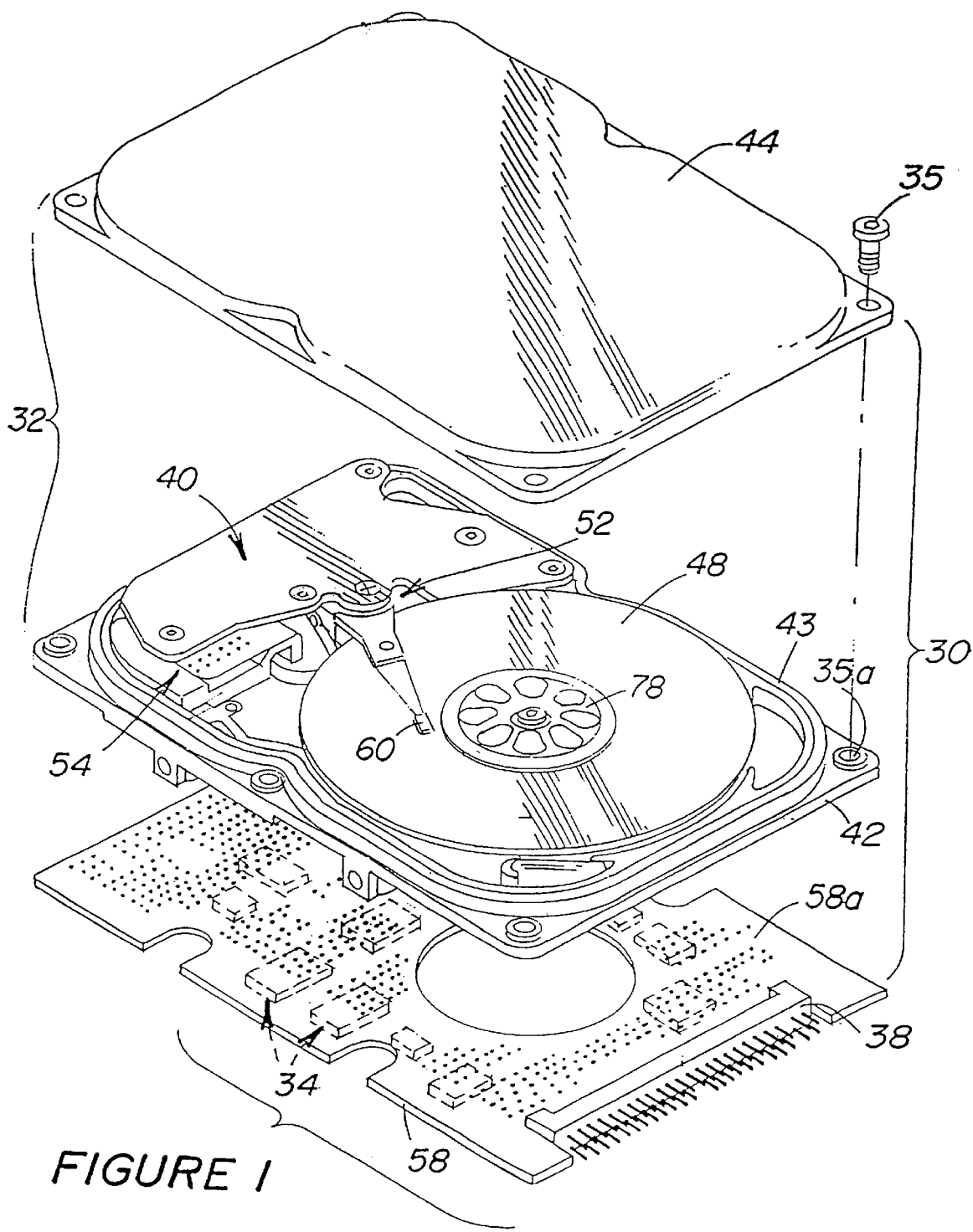
FIG. 1 is a perspective view of the hard disk assembly (HDA) and printed circuit board of the disk drive of the present invention.

As shown in FIGS. 1 and 2, a disk drive 30 in accordance with the present invention includes two main components, a head-disk-assembly (HDA) 32 and a printed circuit board 58 having mounted thereon control electronics 34 which provide control signals to HDA 32, receive data signals from and transmit data signals to HDA 32, and interface disk drive 30 with a host system. The host system may be, for example, a computer, a printer, or a facsimile-machine. A third component of disk drive 30 is a plug-in connector 38 provided on the printed circuit board 58 and designed to be compatible with connectors used in such host systems.

Figure 3:
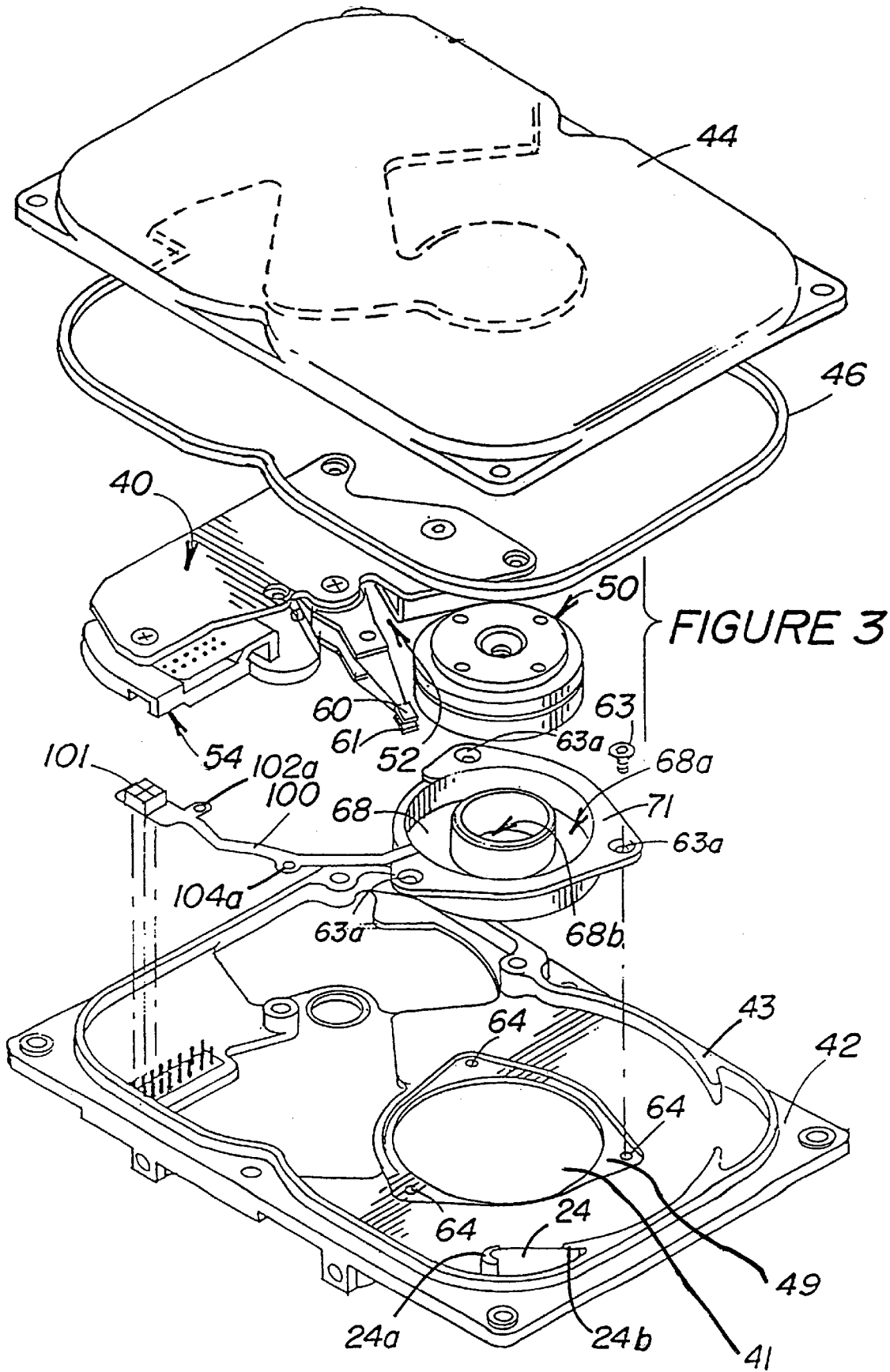
FIG. 3 is an exploded, perspective view of the hard disk assembly of the disk drive of the present invention.

With reference to FIGS. 1–3, HDA 32 includes a base 42 and a cover 44. Cover 44 is secured to base 42 by hex screws provided through bores in lip 45 to threaded bores 35a in base 42. A gasket 46 is provided between base 42 and cover 44 to establish a sealed (or controlled) environment between base 42 and cover 44 when secured.

A unique aspect of HDA 32 of the disk drive of the present invention is the incorporation of the so-called "bath-tub" type base plate design within a 2½" form factor disk drive. Traditionally, bathtub type designs, e.g., a drive whose base plate includes a walled well into which the main components of the drive are placed, are not as desireable form a manufacturing perspective, since flat base plate designs render the drive substantially easier to assemble. In bathtub type designs, special tools are often required to install the internal components of the drive into the base plate. However, such designs are generally more rigid because greater stability is provided by the wall on the base plate surrounding the drive components. In disk drive 30, as will be discussed in further detail below, the assembly speed problem is significantly reduced through the use of integrated actuator and header assembly design, allowing for the assembly to be pre-assembled and inserted into base plate, and an integrated spin motor design which may be easily pre-assembled and tested prior to drive assembly.

Figure 7:
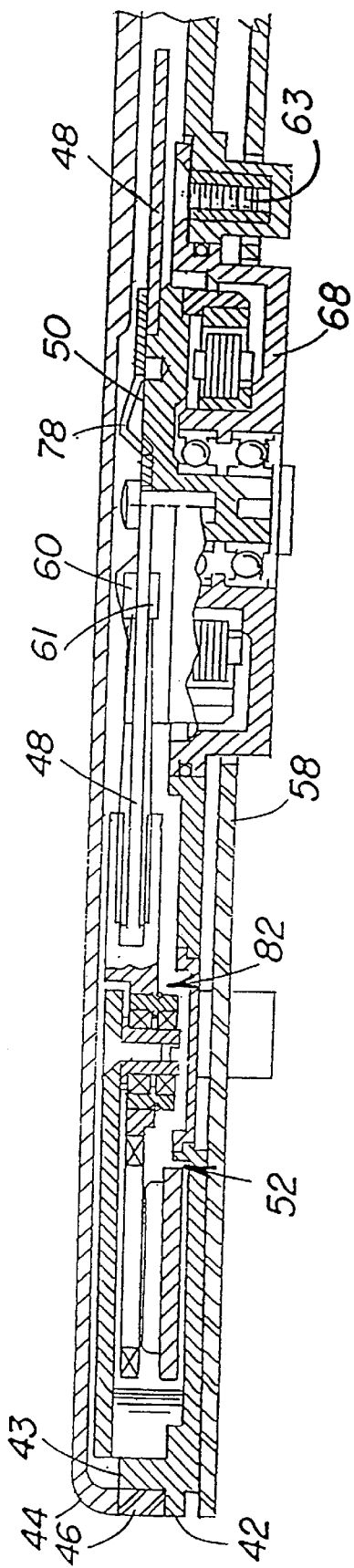
FIG. 7 is a cross-sectional view along lines 6—6 FIG. 6.

The bathtub-type base plate provides a significant sealing advantage for the controlled environment. In particular, a labyrinth seal is provided (as shown in FIG. 7) in that wall 43 of base 42 and lip 45 of cover 44 engage to form an intersecting relationship; e.g., there is no direct "line of sight" into the controlled environment of drive 30 when drive 30 is viewed as shown in FIGS. 2A or 2C.

Disk drive 30 does not utilize a breather filter, and the seal provided by gasket 46, and the aforementioned labyrinth seal, isolate the controlled environment between cover 44 and base 42 from ambient atmospheric conditions and pressures. The seal between base 42 and cover 44 is stable at pressures experienced at altitudes from 200 feet below sea level to 10,000 feet above sea level during operation of the disk drive.

A filter 24, having 0.3 micron filter media is provided in the internal air flow path to maintain a clean environment, thereby assisting in ensuring a contaminant-free, controlled environment between base 42 and cover 44. Filter 24 is slidably mounted in notches 24A and 24B formed on the interior of base 42.

With reference to FIGS. 1 and 3, the components provided in the controlled environment established by HDA 32 include a disk 48, a spin motor 50 for rotating disk 48, read/write heads 60, 61 for interacting with disk 48, and an integrated actuator/header assembly 40. Actuator/header assembly 40 includes: an actuator assembly 52 for positioning heads 60, 61 with respect to disk 48; a header assembly 54 for transferring electronic signals to and from PCB 58 and actuator assembly 52, heads 60, 61 and spin motor 50; and a latch assembly 56 for parking actuator assembly 52.

Figure 4:
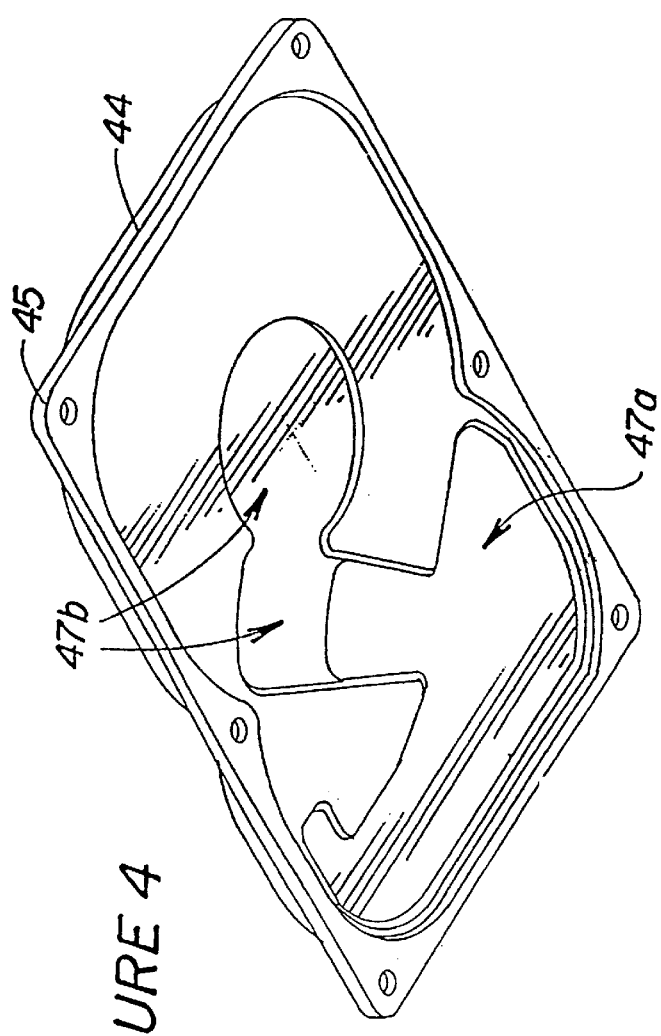
FIG. 4 is a perspective view of the bottom of the cover of the disk drive of the present invention.

As shown in FIG. 4, cover 44 is machined to have recessed portions 47a, 47b provided therein to accommodate actuator/header assembly 40 and disk clamp ring 78. Recessed portions 47a, 47b are shaped to allow thinner portions of the cover to overlie top plate 114 and actuator arm 82, while allowing the remainder of cover 44 to remain as thick and rigid as possible. This feature of cover 44 allows for maximizing rigidity in cover 44 while providing adequate clearance necessary in achieving a total drive height of approximately 0.49" or 12.5 mm.

Control electronics 34 are provided on a printed circuit board (PCB) 58. Control electronics 34 may be provided on both top surface 58a and bottom surface 58b of PCB 58. Control electronics 34 control the operation of spin motor 50, the operation of actuator assembly 52, and the transfer of data to and from disk 48. PCB 58 is mounted to base 42 and electrically grounded to HDA 32.

The dimensions of disk drive 30 are shown in FIGS. 2A–2C.

As mentioned above, the dimensions of PCB 58 have been matched to the dimensions of HDA 32 as shown in FIGS. 1–3, and specifically to form an intersecting arrangement with base 42. Thus, the dimensions of the length and width of HDA 32 substantially define the minimum footprint of the drive. Base 42 includes four mounting posts extending from the bottom thereof to facilitate mounting drive 30 in a host system. As shown specifically in FIGS. 2A and 2B, PCB 58 includes notches 36a to accommodate ports 36 and allow PCB 58 to be attached to base 42 as packaging limitations of control electronics 34 will allow. As shown in FIG. 2B, PCB 58 is generally secured to base 42 by hex screws 37 in threaded bores in the bottom of base 42.

The form factor selected for the disk drive of the present invention is a two and one-half inch form factor, with a reduced height of approximately 12.5 mm or 0.4925". As shown in FIGS. 2A–2C, disk drive 30 of the present invention has dimensions as follows: a length (L) of approximately 101.6 mm (4 inches); a width (W) of approximately 69.8 mm (2¾ inches); and a height (H) of approximately 12.5 mm (0.4925 inches).

The above-described basic structure of disk drive 30 provides protection from shock and vibration. In particular, disk drive 30 will withstand nonoperating shocks on the order of 100 Gs and operating shocks, without nonrecoverable errors, of 10 Gs. Nonoperating vibration of 5.0 Gs in the range of 0–500 Hz is the specified tolerable limit. Operating vibration, without nonrecoverable data, is specified at 0.5 Gs for the range of 0–500 Hz.

Disk 48 will be described with reference to FIGS. 5 and 16. The outside diameter (OD) of disk 48 is 65 mm and the inside diameter (ID) is 20 mm.

In an alternative embodiment, disk 48 may be formed of a glass substrate provided with a magnetic coating and has a thickness t of approximately 0.381 mm±0.080 mm (0.015"±0.0031"). A glass substrate provides a smoother disk surface than conventional aluminum substrates and thus reduces the glide height of heads 60, 61. The glide height for a conventional aluminum substrate disk is 4 microinches. The glide height for glass substrate disk 48 is approximately 2 microinches. Reducing glide height results in an increase in data storage density. In addition, a glass substrate is lighter and more rigid than an aluminum substrate. Using a glass substrate provides a reduction in the disk thickness from 0.635 mm to 0.381 mm.

Disk 48 has a data band 62, shown in FIG. 16, having an inside diameter DID of approximately 0.74 in and an outside diameter DOD of approximately 1.22". A data band of this size on each disk surface provides a data storage area of approximately 2.72 in$^2$.

Figure 6:
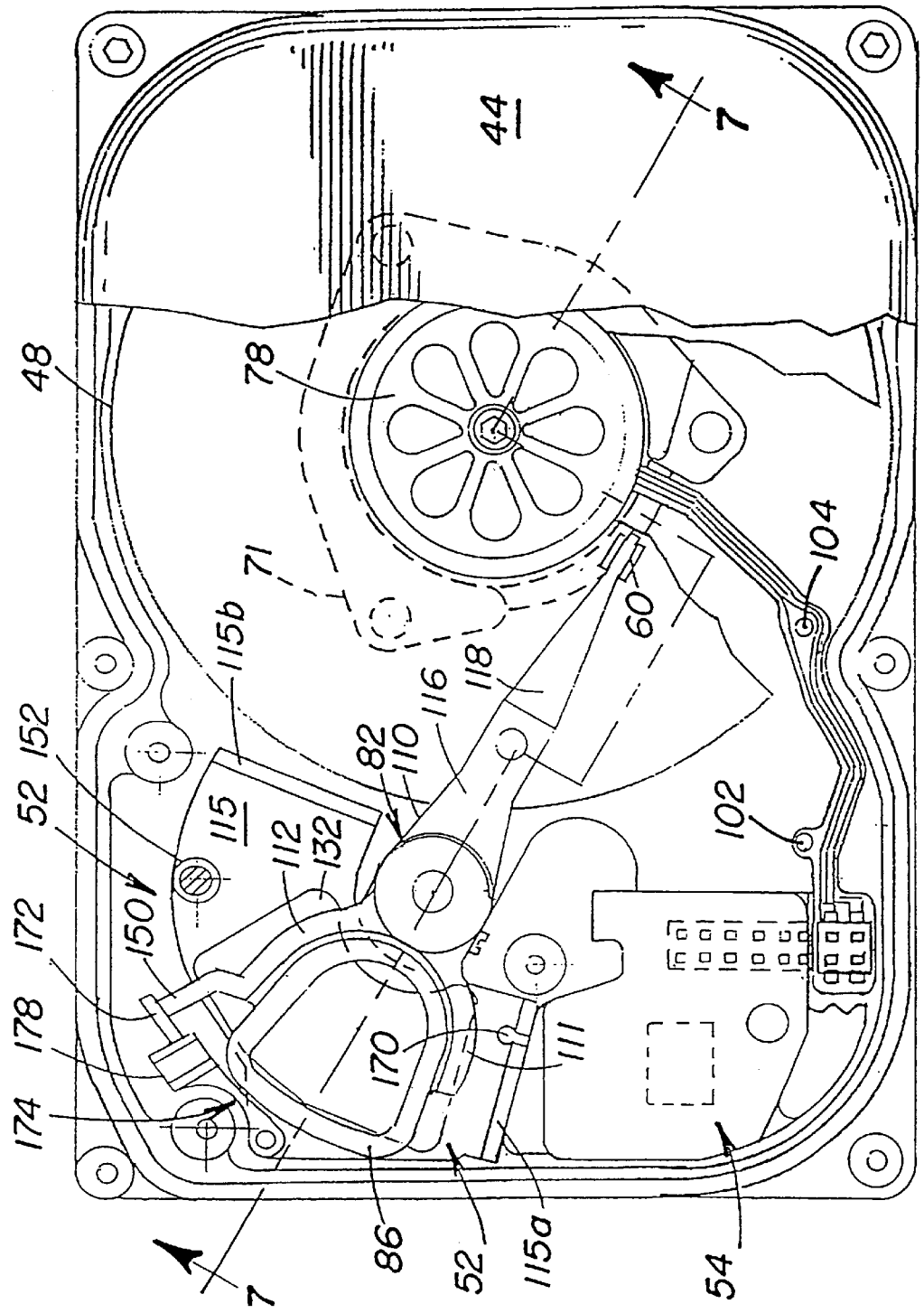
FIG. 6 is a plan view of the disk drive of the present invention with the top plate of the actuator/header assembly removed.

Spin motor 50 supports and rotates disk 48. As shown in FIGS. 3, 7, and 7B, spin motor 50 is an under-the-hub, rotating shaft-type motor, and is secured to base 42 using a minimal amount of adhesives. With specific reference to FIG. 7, which is a cross-sectional view along line 7—7 in FIG. 6, and FIG. 7B, which is an enlarged cross-sectional view of spin motor 50, the construction of motor 50 is hereafter described.

Motor base 68 includes a central cavity 68a for mounting first and second bearings 66, 67, and a recess 68b for positioning a stator 70. Motor base 68 includes a mounting flange 71 which is used to secure motor base 68 and motor 50 in drive 30. Bearings 66, 67 are press-fit into cavity 68a and are separated by spacer 69 molded into support 68 and cavity 68a. Bearings 66, 67 are secured into support 68 by a so-called 3-bond adhesive, such as Model 1353 adhesives, which may be cured by heat, UV radiation, or air. A one-piece molded shaft/hub member, including shaft portion 72 and hub portion 74 is rotatably mounted on bearings 66, 67, such that shaft 72 is secured against the inner races of bearings 66, 67. Hub portion 74 has a disk mounting surface 76 which supports disk 48. A clamp ring 78 is secured to the shaft/hub 72, 74 by a screw 80, and functions to secure disk 48 to hub 74. Shaft/hub member 72, 74 is formed of aluminum and is a single, integrated structure, thereby reducing the adhesives used in drive 30. (In prior art drive designs, adhesives were required to assemble a separately manufactured shaft and hub assembly.) A rotor 81 comprising a multi-pole ring magnet 81a and a non-magnetic collar 81b are mounted on hub 74 so that rotor 81 is adjacent to and concentric with stator 70. Stator 70 is mounted in recess 68b on a spacer ring 70-1.

The use of a rotating shaft motor, as opposed to a stationary shaft motor, reduces the friction attributable to the bearings 66, 67 since the rotation of the inner race of each bearing 66, 67 as opposed to the outer race causes fewer rotations of the ball bearings between the inner and outer races.

The use of motor base 68 with spin motor 50 in drive 30 furthers the design objective of adhesive reduction in the drive. In prior art designs, motor components such as the bearings would be secured in the base-plate or support by adhesives, and/or the disk mounting support would be adhesively secured to the base plate of the drive. In drive 30, motor 50 and motor base 68 are secured to base plate 42 by screws 63 provided through bores 63a in flange 71 of motor base 68, and into threaded bores 64 in base 42. An O-ring 65 is placed in notch 65a of motor base 68 to ensure a seal between motor base 68 and drive base 42, and between the ambient environment and the controlled environment of drive 30. As shown in FIG. 3, base 42 includes a recessed portion 49, having a shape corresponding to flange 71, and a hole 41 for receiving support 68 and motor 50. By using screws 63 which do not compromise the controlled environment between base 42 and cover 44, a reduction in adhesives in spin motor assembly contributes to the overall improvement in drive yields. Motor 50 is generally pre-assembled before insertion into base 42, thereby further reducing adhesive usage. A seal cap 73 is secured into a detent at the bottom of support 68 to provide a seal for bearing 67. Cap 73 is one of the few pieces in the drive secured with a pressure sensitive adhesive such as LOCTITE adhesive manufactured by Loctite Canals, Inc., of Messessanga, Canada. Cap 73 is the final assembly piece of motor 50. Motor 50 may thereafter be "baked" at a temperature of 70° C. for a period of 120 minutes to cure the 3-bond adhesives and reduce outgassing from the LOCTITE adhesive.

Actuator/header assembly 40 performs the functions of positioning heads 60, 61 with respect to disk 48 and transferring electrical information from control electronics 34 on PCB 58 to components in the controlled environment. As shown in FIG. 3, actuator/header assembly 40 is an integrated assembly which may be assembled prior to installation into the drive. Actuator/header assembly 40 is comprised of two subassemblies: actuator assembly 52 and header assembly 54, as shown in FIGS. 6 and 8.

Actuator assembly 52 positions heads 60, 61 with respect to disk 48. Actuator assembly 52 will be described with respect to FIGS. 3, 5, 6, 7A and 8. An actuator 82 supports heads 60, 61 mounted at a first end 82a of actuator 82, and an actuator coil 86 mounted at a second end 82b of actuator 82.

Figure 7A:
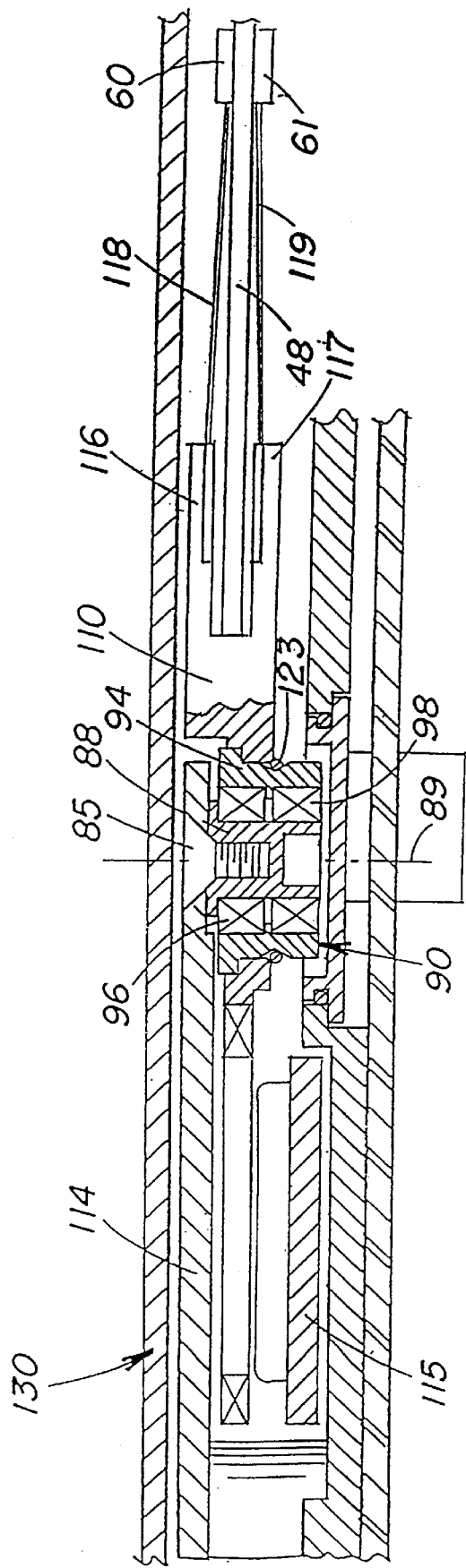
FIG. 7A is a cross-sectional view of the actuator assembly, enlarged from FIG. 7.
Figure 7B:
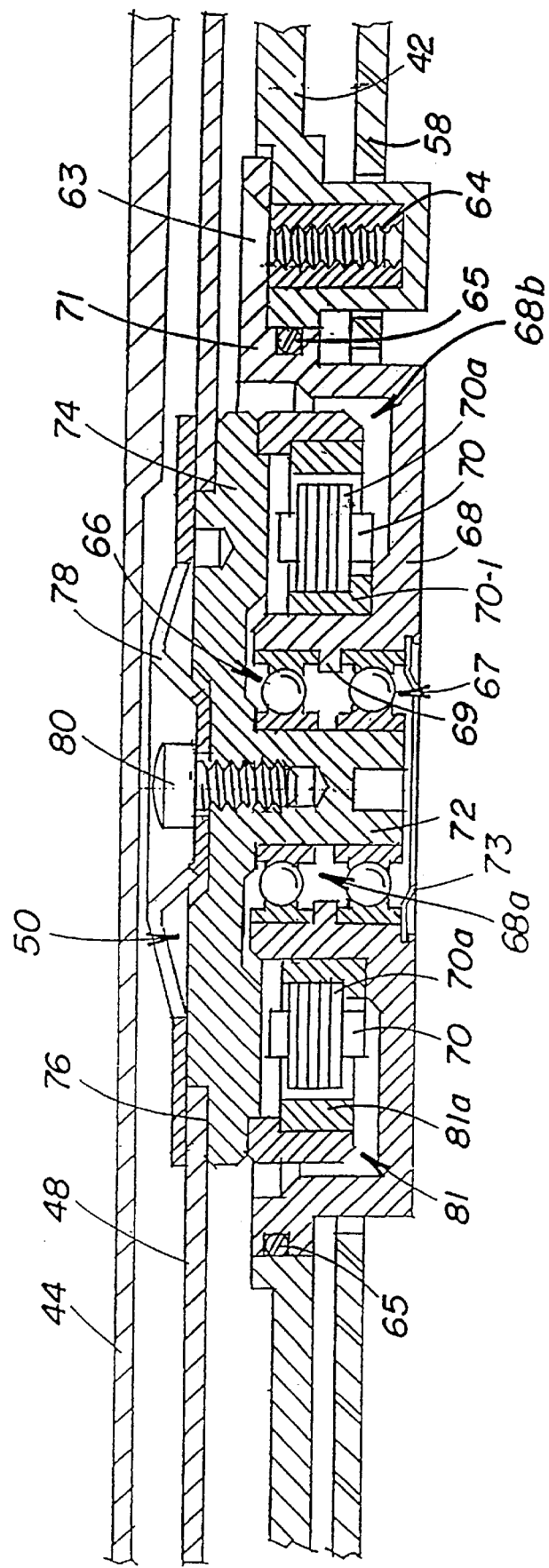
FIG. 7B is a cross-sectional view of the spin motor assembly, enlarged from FIG. 7.
Figure 8:
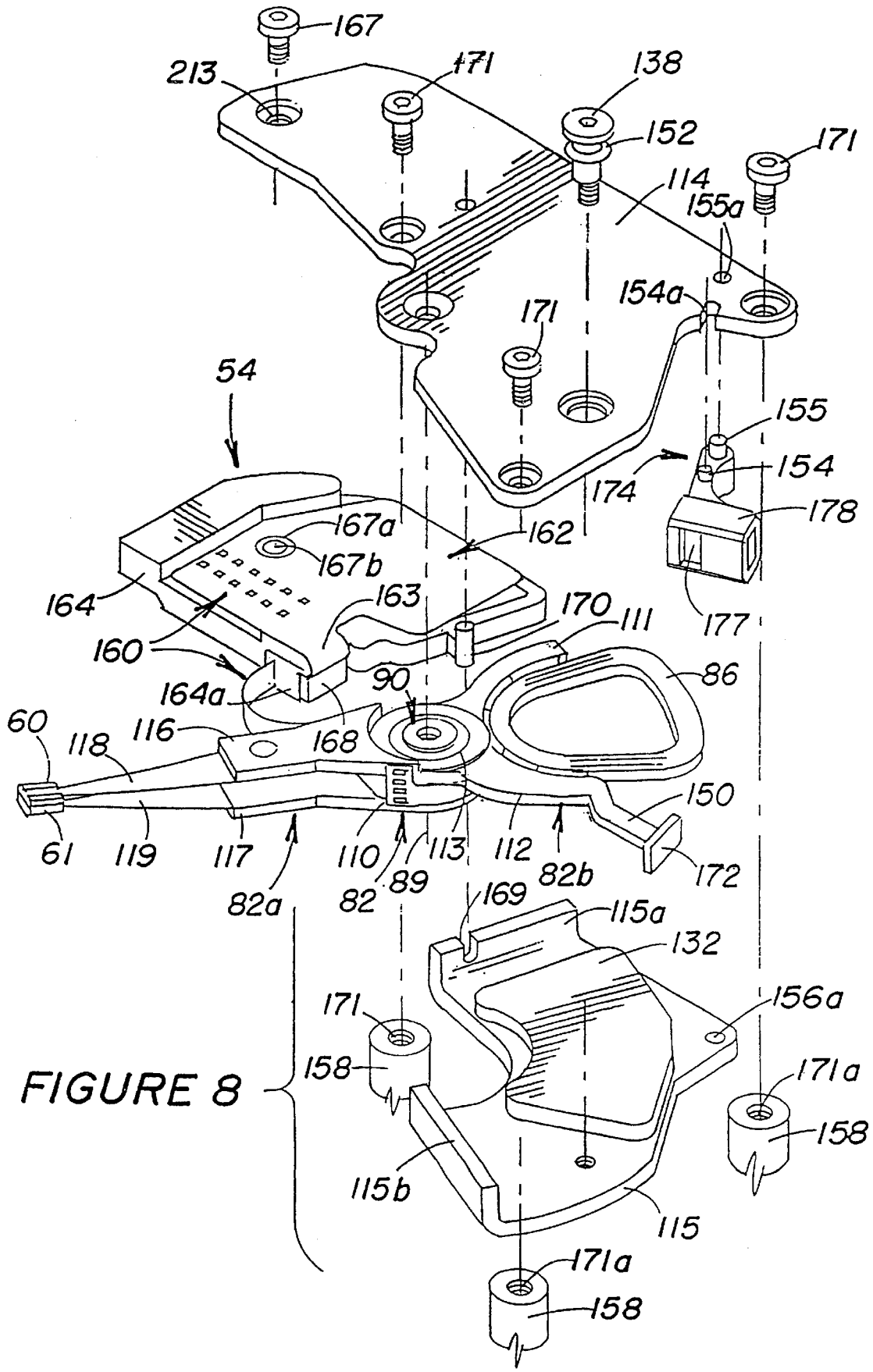
FIG. 8 is an exploded, perspective view of the integrated actuator/header assembly of the disk drive of the present invention.

With reference to FIGS. 7A, 8, and 12, actuator 82 includes arm body 110 having arms 111, 112 for supporting actuator coil 86, and a mounting hole 113 for engaging a bearing cartridge 90. Arm body 110 also includes arms 116, 117 which support load beams 118, 119. As shown in FIG. 7A, bearing cartridge 90 comprises bearings 96, 98 which are secured into casing 94 with adhesive, and an actuator post 88 which is inserted into the cavity defined by the inner races of bearings 96, 98. Actuator post 88 is secured to top plate 114 by a threaded screw 85. Actuator post 88 includes a flange base 88a which interfaces with bearing 96, thereby assuring that bearing cartridge 90 rotates about the central axis 89 of actuator post 88, and that there is adequate clearance between actuator 82 and top plate 114. Casing 94 includes a flange 94a which intersects with arm body 110 when cartridge 90 is positioned in a bore in arm body 110. Cartridge 90 is thus secured to top plate 114.

In prior art drives, the actuator body would be mounted on the base by an actuator post, protruding from the base, and a bearing cartridge, which would be inserted over the actuator post and thereafter secured thereto by adhesives or a set screw. However, in drive 30, to provide for integration of actuator/header assembly 40, actuator body 40 is mounted to top plate 114. A lock collar 123 is secured in a notch in casing 94 and secures actuator body 110 and bearing cartridge 90 to top plate 114.

First and second load beams 118, 119 are staked to respective ones of actuator arms 116, 117. First and second flexures (not shown) support respective ones of heads 60, 61 on respective ones of load beams 118, 119.

The force necessary to pivot actuator arm 82 is created by a voice coil motor including coil 86 and a magnet structure 130. Magnet structure 130 includes a bipolar magnet 132, top and bottom plates 114, 115. Bottom plate 115 includes lip portions 115a, 115b which engage top plate 114 to form a magnetic circuit path for the flux provided by bipolar magnet 132. Top and bottom plates 114, 115 function as returns for the magnetic fields provided by magnet 132. It is important that there are no air gaps between lips 115a, 115b and top plate 114, as any air gap would create a discontinuity in the return, greatly reducing the strength of the magnetic field between top plate 114 and bottom plate 115. The components of magnet structure 130 are formed of magnetically permeable material, in this case low carbon steel, to provide returns for the magnetic fields generated by magnet 132. Magnet structure 130 and actuator coil 86 are arranged so that coil 86 is placed in the magnetic fields created by magnet 132. Currents passing in coil 86 create torques so that actuator arm 82 may be pivoted to position heads 60, 61 at selected locations with respect to disk 48. The voice coil motor thus provides the force necessary to rotate actuator 82 to position heads 66, 67 at any number of locations between the DOD, as shown in FIG. 5, and the DID, as shown in FIG. 6. Actuator arm 82, including all of the components attached thereto, is precisely balanced, i.e., equal amounts of weight are provided on either side of the pivot axis 89 so that the pivoting of actuator arm 82 to position heads 60, 61 has a low susceptibility to linear shock and vibration.

Actuator assembly 48 provides average access times of less than 14 milliseconds, due to the high power-to-mass ratio and the small moment of inertia of actuator arm 82. Actuator arm 82 has a moment of inertia which is approximately $2.2 \times 10^{-6}$ in$^2$-lb$_m$.

Figure 5:
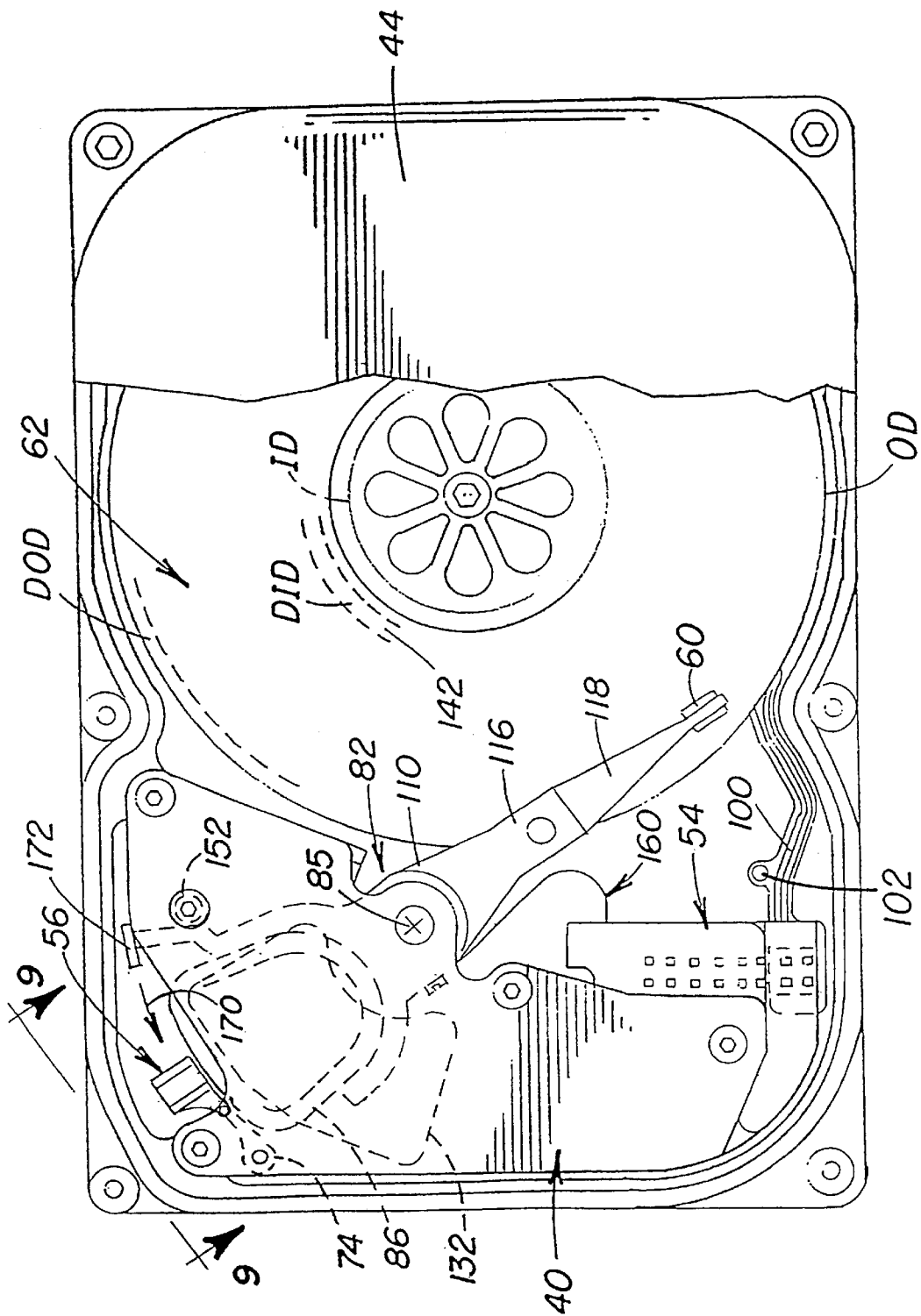
FIG. 5 is a plan view of the disk drive of the present invention.

With reference to FIGS. 5, 6 and 8, crash stops are provided to limit the pivoting movement of actuator arm 82 so that heads 46 travel only between a landing zone 142 adjacent the DID, and at the outside data diameter DOD of disk 48. A landing zone (or non-data area) 142 is located adjacent to inside diameter DID. Actuator assembly 52 positions the heads 60, 61 over landing zone 142 during parking, as shown in FIG. 6. Landing zone 142 may be any selected portion of disk 48; however, a portion of disk 48 adjacent to the DID or DOD is usually selected. With reference to FIG. 6, actuator body 110, contacts both an inside diameter crash stop and an outside diameter crash stop. The outside diameter crash stop is provided by a sleeve 152 which fits over post 138. Post 138 has a threaded bottom end, is provided through bore 138a, and secured to bottom plate 115 thereby. When the pivoting motion of actuator arm 82 places heads 60, 61 at the DOD of disk 48 actuator arm 82, and particularly latch arm 150, contacts outside diameter crash stop 152, as shown in FIG. 5. Latch arm 150 is formed as a part of actuator body 110 and coil arm 112. The inside diameter crash stop is provided by the latch mechanism and is described below.

Latch assembly 56 will be described with reference to FIGS. 6, 8, and 9. The purpose of the latch mechanism is to lock actuator arm 82 in a position when heads 60, 61 are located over landing zone 142 of disk 48. Latch assembly 56 includes: a latch pin 172 mounted on latch arm 150; a latch body 174 positioned between top plate 114 and bottom plate 115; a magnet 176 mounted in latch body 174; and a rubber bumper 175, surrounding magnet 176.

Three pins 154, 155, 156 are cast as a portion of latch body 174. Body 174 is secured to top plate by a press fit between posts 154 and 155 to bore 154a and 155a, respectively. When top plate 114 is secured to bottom plate 115, pin 156 engages notch 156a. A housing 178 comprises a portion of latch body 174 and encases magnet 176 and bumper 175. To secure the actuator arm 82, the control electronics 34 positions actuator arm 82 such that latch arm 150 and pin 172 are moved along the direction of arrow 170 into notch 177 in housing 178. It should be noted that pin 172 does not physically contact any portion of housing 178 and functions in accordance with the principles set forth in co-pending U.S. patent application Ser. No. 07/643,703, entitled MAGNETIC PARKING DEVICE FOR DISK DRIVES, which is a file wrapper continuation of Ser. No. 07/269,873, filed Nov. 10, 1988. To release the latch mechanism, a maximum amount of available power is diverted to coil 86 for approximately 100 milliseconds. The force generated by the voice coil motor is sufficient to overcome the retention force of the latch mechanism.

Top plate 114 and bottom plate 115 are manufactured from low carbon steel to provide maximum strength at a minimum thickness. In general, top plate 114 and bottom plate 115 have a thickness of 0.044 inch, which contributes to the height reduction objective of disk drive 30. The top plate serves two functions, both as a return path for the magnetic flux, and a rigid mounting structure for actuator assembly 52 and header assembly 54.

Header assembly 54 transfers data and control signals from control electronics 34 on PCB 58 to the controlled environment between base 42 and cover 44. As noted above, header assembly 54 is incorporated as a subassembly of actuator/header assembly 40. Header assembly 54 will be described with reference to FIGS. 5, 6, 8, and 10–12. Header assembly 54 also includes an actuator flex circuit 160 to provide electrical connections to heads 60, 61 and actuator coil 86, mounted on rotating actuator arm 82. A molded plastic flex circuit bracket 164, manufactured from a material such as ULTEM 1000, has a shape generally corresponding to the shape of posterior portion 162 of flex circuit 160, and supports and retains flex circuit 160 in drive 30. Connector pins 166 are embedded in a plastic header 165, and header 165 is potted base 42. Pins 166 connect directly to a reverse entry connector on PCB 58.

Flex circuit 160 is a reverse flex circuit. A connector 165 is secured to posterior portion 162 of flex circuit 160. Connector 165 engages pins 166 to provide coupling to the electrical leads on actuator flex circuit 160. Posterior portion 162 of actuator flex circuit 160 is coupled to bracket 164 by a single hex screw 167 provided through bore 167a in actuator flex circuit 160 and into threaded bore 167b in bracket 164. As is shown in FIG. 8, hex screw 167 is provided through bore 213 in top plate 114 and, in conjunction with pin 170, acts to secure header assembly 54 to header/actuator assembly 40. Flex circuit 160 includes a lateral portion 163 which wraps around an arm 164a of bracket 164. A clamp bracket 168 is used to secure lateral portion 163 around arm 164a in a wrapped configuration as shown in FIG. 11. As shown in FIG. 8, a notch 169 is provided in bottom plate 115 and engages pin 170 such that when bottom plate 115 is secured to actuator/header assembly 40, header assembly 54 is secured at two points: at pin 170 and at hex screw 167.

As shown in FIG. 10, flex circuit 160 includes a region 159 for providing a controller chip (not shown) and coupling the controller chip to flex circuit 160. The controller chip at this interface acts in concert with the control electronics 34 on PCB 58 to provide control signals to the internal components of the drive. Pins 166 engage a corresponding geometrical arrangement of electrical leads on posterior portion 162 of flex circuit 160 indicated at region 162a in FIG. 10.

In accordance with the objective of adhesive reduction in the drive, flex circuit 160 is attached at all points by non-adhesive means. As discussed above, flex circuit 160 is attached to bracket 164 by hex screw 167 and by bracket 168. Flex circuit 160 is attached to actuator arm body 110 by two flat head screws 180, 182 provided through bore 180a in circuit 160. Tab 181 on flex circuit 160 includes two leads which are coupled to coil 86 to provide current for driving coil 86 in the voice coil motor. Flathead screw 180 is placed through bore 180a in circuit 160 and secured to arm body 110. Anterior end 161 of flex circuit 160 includes four leads which couple electrical leads (not shown) to head 60, 61. Anterior end 161 includes a second bore 161a, and wraps around arm body 110 between arms 116 and 117, and is secured to actuator arm body 110 by placing screw 182 through bore 161a.

A spin motor flex circuit 100 couples electrical signals from control electronics 34 to spin motor 50 to provide current for driving spin motor 50. Spin motor flex circuit 100 will be described with reference to FIGS. 3 and 6. As shown in FIG. 3, spin motor flex circuit 100 is coupled to pins 166 by a four-prong receptor 101. Spin motor flex circuit 100 is secured to base by forcing bores 102a, 104a over two posts 102, 104 cast in base 42, using an interference fit to secure spin motor flex circuit 100. Again, no adhesives are used in coupling spin motor flex circuit 100 in drive 30. Spin motor flex circuit 100 runs over flange 71 and the electrical leads thereon are secured to motor 50. In this manner, a further reduction in pressure sensitive adhesives is realized within the drive.

As is shown in FIG. 8 and as discussed above, the assembled header assembly 54 is secured to top plate 114 by hex screw 167. Further, as discussed above, actuator arm 82 is secured to top plate 114 and bottom plate 115 is secured to top plate 114 by hex screw 138. Notch 169 engages pin 170 and, when assembled, actuator/header assembly 40 can be pre-assembled and tested before being placed into base 42. Actuator/header assembly 40 may then be secured into drive 30 by hex screws 171 which are threaded into threaded bores 171a on posts 158 in base 42.

By securing actuator arm 82 to top plate 114, an integrated actuator/header assembly 40 is provided. By providing such an integrated assembly, and pre-testing the assembly prior to installation in drive 30, production yields can be improved by reducing failures attributable to a problem in the voice coil motor, or the actuator flex circuit. The same is true for spin motor 50 which, when coupled to support 68, can be pretested prior to assembly into the base plate. This provides that spin motor failure in disk drives will be reduced, thereby increasing the production yield for drives 30.

Tables 1 and 2 below specify certain characteristics of disk 48.

TABLE 1

| | |
|---|---|
| Number of Disks | 1 |
| Number of Data Surfaces | 2 |
| Number Data Cylinders (Tracks per surface) | 1,181 cylinders |
| Sectors per Track | 53 sectors |
| Bytes per Sector | 666 bytes |
| Data Bytes per Sector | 512 bytes |
| Data Capacity per Data Surface (formatted) | 32 Mbytes |
| Total Data Capacity (formatted) | 64 Mbytes |

TABLE 2

| | |
|---|---|
| Disk Data Outside Diameter | 22.61 millimeters |
| Disk Data Inside Diameter | 14.22 millimeters |
| Data Track Band Width | 8.39 millimeters |
| Track Density | 580 tracks/inch |
| Bit Density (max) | 59,500 fci |
| Head Width | 7.5 microns |
| Track Width | 10.8 microns |

The characteristics shown in Tables 1 and 2 are based on the utilization of thin-film heads 60, 61. Standard metal-in-gap (MIG) heads or double MIG may also be utilized. In the disk drive of the present invention, each head reads bits at a rate of $3.7 \times 10^6$ bits/sec. Thus, the maximum data transfer rate is approximately 2.25 Mbytes/sec.

For a single disk drive, a formatted data storage capacity of 65 Mbytes requires a flux density of 44,700 fci at the DID.

The many features and advantages of the disk drive of the present invention will be apparent to those skilled in the art from the Description of the Preferred Embodiments and the Drawings. Thus, the following claims are intended to cover all modifications and equivalents falling within the scope of the invention.

We claim:

1. A disk drive, comprising:

a base having a top surface and a bottom surface;

a storage disk;

interactive means for reading information from and writing information on the storage disk;

a plate having portions affixed by a first fastener to said top surface of the base, said plate having a top surface and a bottom surface;

an actuator assembly affixed by a second fastener to said bottom surface of said plate and provided above said base, said second fastener being separate and independent from said first fastener and said second fastener not contacting said base, said actuator assembly being capable of selectively positioning the interactive means with respect to the storage disk in response to control signals;

a header affixed to said bottom surface of said plate and provided above said base, said header being capable of transferring said control signals to said actuator assembly;

a cover sealably attached to the base, the base and cover enclosing the disk, the interactive means, the header, and the actuator assembly; and control means for generating control signals to control the actuator assembly and for providing information signals to and receiving information signals from the interactive means.

2. The disk drive of claim 1 wherein the control means comprises a printed circuit board having control electronics provided thereon.

3. The disk drive of claim 2 wherein the header includes:

a connector, potted in the base and engaging the printed circuit board, an actuator flex circuit, coupled to the connector and the actuator assembly, and a spin motor flex circuit coupled to the connector and the spin motor.

4. The disk drive of claim 1 wherein the actuator assembly comprises:

a permanent magnet affixed to the base and providing a magnetic field, an actuator arm having first end and a second end, the first end having secured thereto first and second head suspensions, the head suspensions supporting the interactive means, a coil mounted on the second end of the actuator arm in a region of the magnetic field provided by the magnet such that a current in the coil induces a force on the actuator arm, and a bearing cartridge, secured to the actuator arm and to the plate.

5. The disk drive of claim 4 wherein the bearing cartridge is secured to the actuator arm and the plate by non-adhesive means.

6. The disk drive of claim 5 wherein the header includes a connector, potted in the base and engaging the control means;

an actuator flex circuit, having a first end and a second end, the first end being clamped by a header bracket, the second end being secured to the actuator assembly; and a spin motor flex circuit, having a first end and a second end, the first end being clamped by the header bracket, the second end being coupled to the spin motor and secured by the base.

7. A disk drive, comprising:

a housing having a base and a cover;

storage means within said housing for storing data;

interactive means within said housing for transferring said data to and from said storage means;

a spin motor base having portions affixed to the base by a first affixing means;

a spin motor mounted in said spin motor base by a second affixing means, said second affixing means being separate and independent from said first affixing means, the spin motor supporting the storage means and rotating the storage means;

control means adjacent said housing for supplying control signals to the drive;

a plate having portions affixed to said base by a first attachment means;

an actuator assembly affixed to said plate, above said base, by a second attachment means, said second attachment means being separate and independent from said first attachment means and said second attachment means having no physical contact with said base, said actuator assembly being capable of selectively positioning the interactive means with respect to the storage disk in response to said control signals;

a header affixed to said plate, above said base, by a third attachment means, said third attachment means being separate and independent from said first attachment means, said header being capable of transferring said control signals to said actuator assembly and said spin motor.

8. The disk drive of claim 7, said header including a connector, potted in the base and engaging a printed circuit board, a header bracket, an actuator flex circuit, having a first end and a second end, the first end being clamped by the header bracket, the second end being secured to the actuator assembly, and a spin motor flex circuit, having a first end and a second end, the first end being clamped by the header bracket, the second end being coupled to the spin motor and secured by the base.

* * * * *